United States Patent [19]

Meier et al.

[11] Patent Number: 4,471,788

[45] Date of Patent: Sep. 18, 1984

[54] CORN HARVESTER

[75] Inventors: Hubert Meier, Gottmadingen; Ernst Ott, Wittislingen; Hinrich Haake, Ahrensburg, all of Fed. Rep. of Germany

[73] Assignee: Klöckner-Humboldt-Deutz AG (Zweigniederlassung Fahr), Gottmadingen, Fed. Rep. of Germany

[21] Appl. No.: 351,539

[22] Filed: Feb. 23, 1982

Related U.S. Application Data

[63] Continuation-in-part of Ser. No. 277,700, Jun. 26, 1981.

[30] Foreign Application Priority Data

Jun. 28, 1980 [DE] Fed. Rep. of Germany ....... 3024593

[51] Int. Cl.$^3$ .......................... A01F 7/04; A01F 12/30
[52] U.S. Cl. .................... 130/27 F; 130/24; 130/27 E; 130/DIG. 6; 56/14.6
[58] Field of Search .................... 130/5 R, 4, 8, 27 Z, 130/27 F, 27 R, DIG. 2, DIG. 3, DIG. 4, DIG. 6, 24; 56/14.6, 16.4, 16.5, 500

[56] References Cited

U.S. PATENT DOCUMENTS 4,206,581 6/1980 Haake et al. ...................... 56/14.6
4,344,443 9/1982 DeBusscher et al. .......... 130/27 AE Primary Examiner—Gene Mancene
Assistant Examiner—John G. Weiss
Attorney, Agent, or Firm—Karl F. Ross; Herbert Dubno

[57] ABSTRACT

A corn harvester has a chassis adapted to travel along the ground and provided on its front with a device for picking ears off cornstalks. A thresher is provided on the chassis for reducing the ears to fragments including pieces of cob, corn kernels, and pieces of husk, and for displacing these fragments backwardly. A floor in the chassis is positioned to receive the fragments from the thresher and has a rear edge provided with a rearwardly extending comb having spaced apart times. The floor and comb are jointly reciprocated to displace the fragments backwardly, during which operation normally the kernels, which are of greater surface density than the other fragments, move to the bottom of the backwardly moving mass. A rotary stripper is provided on the chassis having fingers orbitable between the teeth of the comb. This stripper is rotated at high speed so as to lift most of the husk and cob pieces off the comb and propel them backwardly. This high-speed action separates any kernels that might be stuck to husk and cob pieces therefrom. A riddle is provided behind and below this comb to form therewith a horizontally open gap so that any fragments that fall through the comb land on this riddle. The riddle is also reciprocated so as to move the fragments thereon backwardly with the smaller and denser fragments falling through the riddle. A blower directs a current of air backwardly through the gap and along the riddle to blow the lighter fragments including mainly the husk pieces backwardly. Only the kernels, therefore, pass through the riddle and are caught and collected. Cob pieces too large to fall through the riddle and too dense to be blown away work their way to the rear end of the riddle which they fall off onto the field behind the harvester.

19 Claims, 7 Drawing Figures

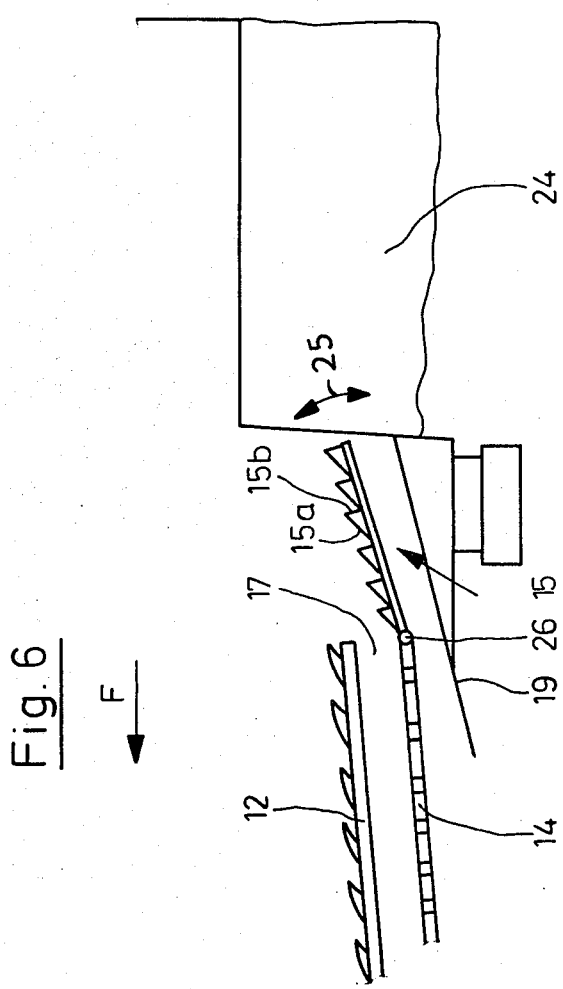

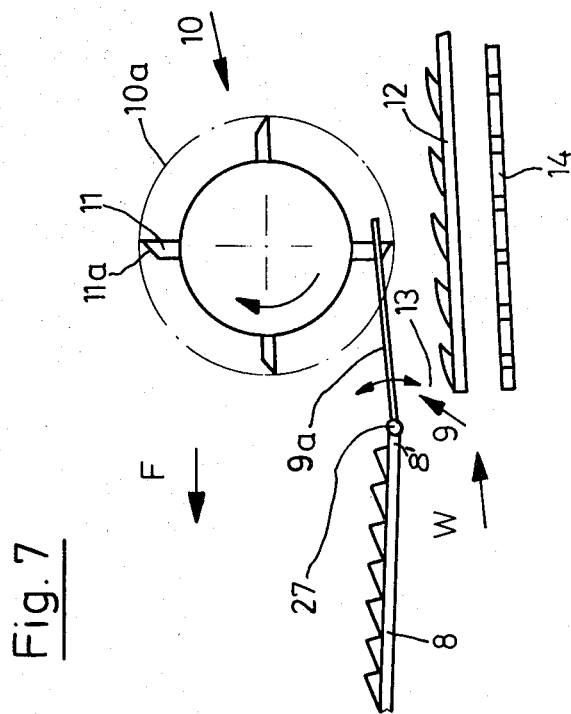

CORN HARVESTER

CROSS REFERENCE TO RELATED APPLICATION

The present application is a continuation in part of our copending application Ser. No. 277,700 filed June 26, 1981.

FIELD OF THE INVENTION

The present invention relates to a corn harvester. More particularly this invention concerns a harvester used to recover mainly the kernels of corn from a standing corn crop.

BACKGROUND OF THE INVENTION

A corn harvester such as described in commonly owned application Ser. No. 955,181 filed Oct. 27, 1978 (now U.S. Pat. No. 4,291,521) and U.S. Pat. No. 4,206,581 strips the ears of corn off cornstalks and then comminutes these ears into fragments including pieces of corn cob, pieces of husk, and kernels. The machine then separates the kernels from the rest of the fragments, retains the kernels, and spreads the rest of the fragments over the field behind the harvester as mulch.

Obviously it is essential that a minimal amount of kernels be lost and that a minimal amount of nonkernel fragments be mixed in with the retained kernels. Hence complex riddle arrangements are provided to separate the kernels from the rest of the fragments. These systems are somewhat complex, and virtually all frequently either waste an unacceptable amount of corn kernels or retain too much nonkernel waste.

Another problem is that the husk pieces which have a low surface density—ratio of surface area to mass—often form a layer on the riddle that prevents the kernels from working their way down and through the riddle. Thus kernels that should be recovered at the riddle ride right through this part of the machine on a layer of husk pieces and are discarded therewith.

In addition it is fairly common for kernels to become stuck to pieces of husk and cob. The comminution crushes some of the kernels and thereby generates a sticky liquid that adheres many of the fragments together. As a result some kernels remain stuck to husk and cob pieces and are discarded with them.

OBJECTS OF THE INVENTION

It is therefore an object of the present invention to provide an improved corn harvester.

Another object is the provision of a corn harvester that wastes substantially less kernels than the prior-art harvesters, yet that at the same time mixes virtually no pieces of husk and cob in with the kernels that are recovered.

SUMMARY OF THE INVENTION

These objects are attained according to the instant invention in a corn harvester having a chassis adapted to travel along the ground and provided on its front with means for picking ears off cornstalks. Threshing means is provided on the chassis for reducing the ears to fragments including pieces of cob, corn kernels, and pieces of husk, and for displacing these fragments backwardly in the chassis. A floor in the chassis is positioned to receive the fragments from the reducing means and has a rear edge provided with a rearwardly extending comb having spaced apart tines. The floor and comb are jointly reciprocated to displace the fragments backwardly thereon, during which operation normally the kernels, which are of greater surface density than the other fragments, move to the bottom of the backwardly moving mass. Most of the kernels will fall between the teeth of the comb at the rear edge of the floor and a rotary stripper is provided on the chassis having fingers orbitable between the teeth of the comb. This stripper is rotated at high speed—normally about 500 RPM—so as to lift most of the husk and cob pieces off the comb and propel them up and back. This high-speed action separates any kernels that might be stuck to husk and cob pieces therefrom. A riddle is provided behind and below this comb to form therewith a horizontally open gap so that any fragments that fall through the comb land on this riddle. The riddle is displaced so as to move the fragments thereon backwardly with the smaller and denser fragments falling through the riddle. A blower directs a current of air backwardly through the gap and along the riddle to blow the lighter fragments including mainly the husk pieces backwardly. Only the kernels, therefore, pass through the riddle and are caught and collected. Cob pieces too large to fall through the riddle and too dense to be blown away work their way to the rear end of the riddle which they fall off onto the field behind the harvester.

Thus with the system according to the instant invention the stripper provided at the end of the floor serves to separate most of the husk pieces from the mix. Simultaneously it separates the light husk pieces from the dense kernels by using inertia, that is by suddenly accelerating the husk pieces so that any kernels stuck thereon are separated. As a result there are few husk pieces left in the mix on the riddle which can, therefore, operate with increased efficiency.

According to further features of this invention the stripper is rotatable about a horizontal axis generally perpendicular to the normal direction of travel of the chassis in a direction to lift the husk pieces from the comb with the fingers. The stripper fingers are angularly offset from one another and may be very rigid and stiff or formed of an elastically deformable material. The angle of the fingers to radii from the stripper axis may be variable, and the front or leading surfaces of the fingers are normally beveled. These fingers interdigitate with the comb, which according to this invention can be pivoted about a horizontal axis at its upstream end and can be locked at any of a multiplicity of angularly offset positions relative thereto. Thus the depth of engagement of the fingers of the stripper between the teeth of the comb can be varied.

In accordance with another feature of this invention the harvester has a curtain suspended from the chassis between the reducing means and the riddle and positioned to intercept the fragments displaced backwardly by the reducing means. This curtain may be provided with a forwardly open and backwardly pointed V-shaped stiffening element at its lower edge in order to deflect the backwardly displaced fragments into the middle of the riddle. The curtain can, alternatively, have a lower edge provided with a generally straight stiffening element extending generally perpendicular to the normal direction of travel of the chassis. The chassis carries a plurality of stops engageable with the ends of the stiffening element when the chassis is tipped and these stops are provided to both lateral sides of the stiffening element and are spaced apart by a transverse distance equal to slightly more than the transverse length of the stiffening element. Thus when the chassis is level the element can swing forwardly and backwardly between and out of contact with the stops. When tipped its downhill end will engage one of the respective stops so it will twist in a direction to deflect the backwardly tossed fragments uphill, countering the normal tendency of them to collect on the downhill lateral side of the riddle.

The riddle according to this invention has a generally horizontal and relatively coarse upper sieve or screen and a generally horizontal and relatively fine lower sieve or screen. The latter has a mesh size of about 13 mm, which is just big enough for a corn kernel to pass through.

The rear or trailing edge of the riddle is provided with an overflow plate extending backwardly and upwardly at an incline. This overflow plate is pivotal, like the comb, so it can be set at an angle determined by the particular operating conditions. It may have like the upper sieve of the riddle transverse sawtooth ridges with steep rear flanks and shallow front flanks and is formed as a sieve. Normally the mesh size of the overflow plate is the same as that of the lower sieve. Any material that does not fall through this overflow plate falls off its rear edge which is outside the harvester, so such material is dumped on the ground.

DESCRIPTION OF THE DRAWING

The above and other objects, features, and advantages will become more readily apparent from the following, reference being made to the accompanying drawing in which:

FIGS. 6 and 7 are further large-scale and mainly schematic views of details of FIG. 1.

SPECIFIC DESCRIPTION

Figure 1:
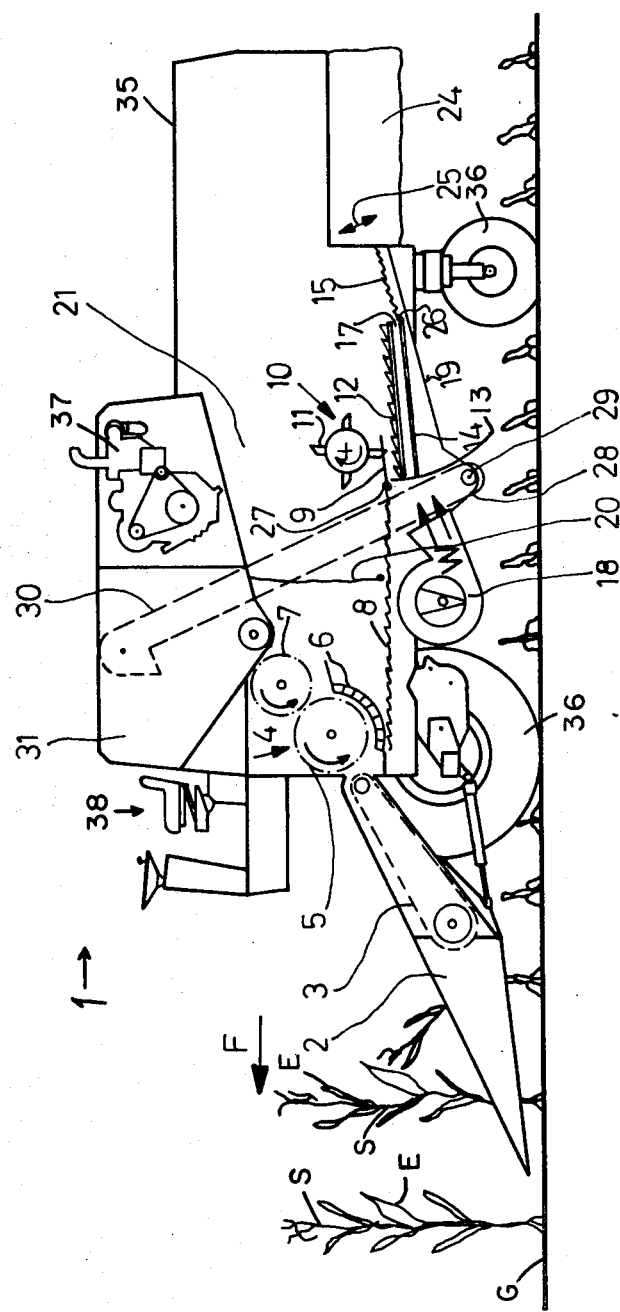
FIG. 1 is a mainly schematic side view of the agricultural machine according to the instant invention.

As shown in FIG. 1 an agricultural machine 1 according to this invention has a chassis 35 supported by front and rear wheels 36 and adapted to travel along the ground G in a direction F. An internal combustion engine 37 drives all of the mechanism of this machine 1 and in turn is operated from an operator's station 38 on the top front of the machine relative to the direction F.

The machine 1 has at its front end an intake 2 provided with a conveyor or stripper 3 adapted to separate ears E of corn from stalks S. Provided immediately behind this intake device 2 there is a threshing or chopping arrangement 4 having a drum 5 rotated continuously by the engine 37 about a horizontal axis and juxtaposed with a threshing concave or grid 6 spaced more closely to the drum 5 at its upstream end than at its downstream end, relative to the counterclockwise direction of rotation of the drum 5 about its horizontal axis. Slightly above and behind this drum 5 is a stripping and deflecting drum 7. The drum 5 is also rotated by the engine 37 at a peripheral speed of between 12 m/sec and 24 m/sec to reduce the ears E to fragments including pieces of cob, corn kernels, and pieces of husk. The drum 7 serves to deflect these fragments backwardly onto a horizontally and transversely ridged floor 8 and also prevents the drum 5 from merely carrying these fragments around in its orbit.

The floor 8 is formed with sawtooth ridges and is reciprocated horizontally by the engine 37 with limited vertical movement in such a manner as to move the fragments received from the drum 5 backwardly in a direction opposite to the direction F. A curtain 20 is hung from the floor of a receptacle or bin 31 and extends transversely to the direction F down to a position immediately above the ridged floor 8. Thus material thrown back through the air will strike this curtain 20 and fall down to the floor 8. As the fragments move backwardly on the floor 8 the lighter fragments will inherently rise to the surface.

According to the instant invention the trailing or downstream edge 8' of the ridged floor 8 is provided as best seen in FIG. 7 with a rearwardly extending comb or rake 9 having teeth 9a and pivotal about a horizontal axle 27 at the extreme downstream edge 8' of the floor 8. Immediately above this comb 9 is a stripper 10 rotatable about a horizontal axis and having elastically deformable teeth 11 defining an orbit 10a on rotation of the stripper 10. Relative to the clockwise rotation direction of the stripper 10 the teeth 11 have inclined front surfaces. These teeth 11 pass between the teeth 9a and keep material from building up on the comb 9.

An axial-input radial-output blower 18 is provided underneath the ridged floor 8 and directs a current W of air horizontally up and backwardly through the space 13 between the comb 9 and an upper coarse sieve 12 that is horizontally reciprocated by the engine 37, normally synchronously with the floor 8. Below this coarse sieve 12 is a round-hole fine sieve 14 that is similarly reciprocated by the engine 37, and below it a floor 19 along which kernels of corn can slide forwardly to a trough 28. The sieves 12 and 13 together form a riddle. An auger 29 in the trough 28 can displace the corn kernels to an elevator 30 that discharges them into the bin 31.

As seen in FIG. 6, connected to the rear of the lower sieve 14 is an overflow plate 15 which is formed with sawtooth ridges identical to those of the floor 8, that is having shallow front flanks 15a and steep rear flanks 15b. This overflow plate 15 is pivotal as shown by arrow 25 about a horizontal axis 26 at the extreme rear end of the sieve 14. The current W of air created by the blower 18 moves back through the space 17 between the sieves 12 and 14 and blows light material out the rear end 24 of the machine.

Figure 3:
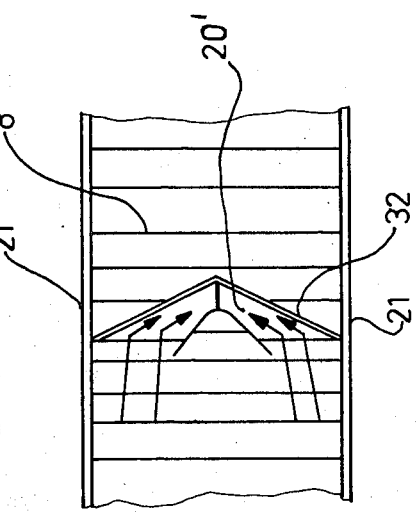
FIG. 3 is a section taken generally along line III—III of FIG. 2.
Figure 2:
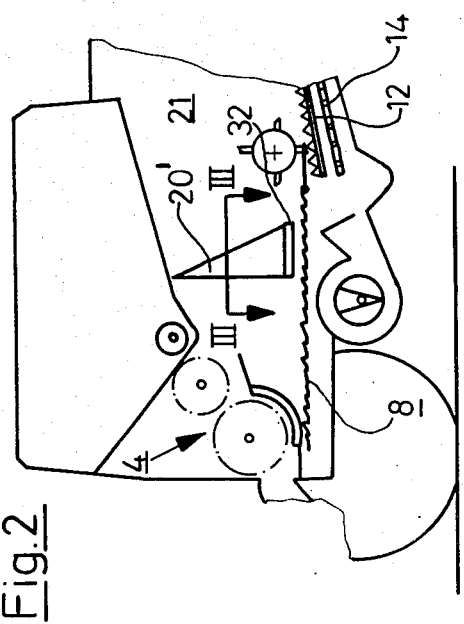
FIG. 2 is a large-scale and mainly schematic view of a detail of FIG. 1.

FIGS. 2 and 3 show an arrangement wherein a curtain 20' substantially identical to the curtain 20 of FIG. 1 is provided at its lower end with a heavy metallic V-shaped stiffener 32 that points backwardly and is flared forwardly. Thus material tossed backwardly against the curtain 20 by the drums 5 and 7 will be deflected into the center of the ridged floor 8 for maximum efficiency and to prevent leakage of some of this material between the side edges of the floor 8 and the side walls 21 of the machine 1.

Figure 5:
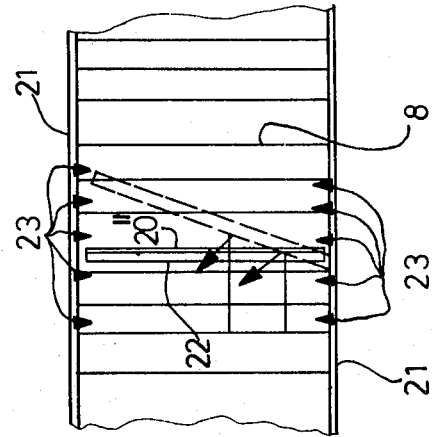
FIGS. 4 and 5 are views corresponding generally to FIGS. 2 and 3 but showing another arrangement according to this invention.
Figure 4:
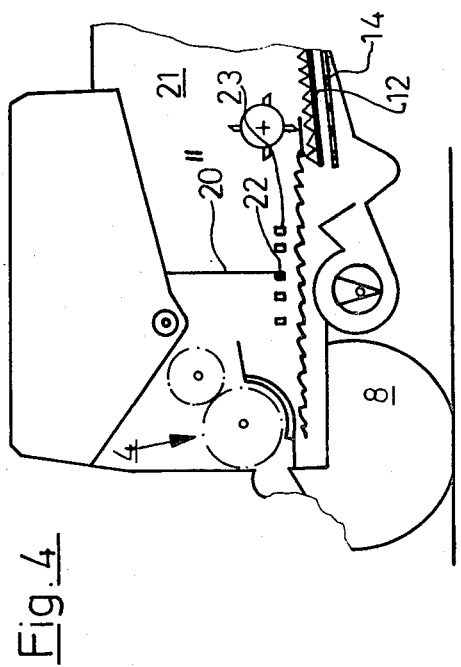

FIGS. 4 and 5 show an arrangement particularly useful when corn is being harvested on a slope. Here a curtain 20" is provided at its lower edge with a horizontally extending and straight stiffener bar 22. Each side wall 21 is provided with five horizontally spaced projections or stops 23. When harvesting on the level the bar 22 will be able to move limitedly forwardly and backwardly free of the stops 23, since the bar 22 is shorter than the transverse distance between opposite stops 23. This is shown in solid lines in FIG. 5. When harvesting on a slope, however, the bar 22 will inherently move toward the lower or downhill side wall 21 as shown in dashed lines in FIG. 5. The force of the material striking the curtain 20" will push the bar 22 and curtain 20" backwardly, but since the one side is engaged with one of the stops 23, this action will only push the other side backwardly. Thus the crop will be deflected away from the downhill side, which is the side of the bar 22 that will engage the stop 23, to counter a natural tendency of the crop to collect on the downhill side.

The arrangement described above functions as follows:

The ears E of corn stripped from the stalks S by the device 3 are husked and most of the kernels of corn are stripped from them. Simultaneously the cobs are chopped up into small pieces, so that a mixture of corn kernels, pieces of corn cob, and pieces of husk is thrown by the drums 5 and 7 onto the ridged reciprocating floor 8.

The reciprocation of this floor 8 moves this mixture backwardly, that is opposite to the direction F, with the kernels and pieces of greater surface density sinking to the bottom of the backwardly moving mixture. These denser and smaller pieces fall between the teeth 9a of the comb 9 and also pass between the correspondingly spaced teeth 11 of the stripper 10. The pieces of husk, which are of substantially less surface density, as well as the kernels and pieces of cob stuck to them are picked up by the stripper 10 rotating at a speed of 500 RPM and tossed up and back. This action separates the kernels and cob pieces from the husk pieces due to the different effect of the change in motion on these denser elements of the mixture. Normally in fact the kernels and cob pieces are separated from the husk pieces directly at the stripper and fall down between the teeth 9a.

The material that falls off the downstream end 8' of the floor 8 will fall through the gap 13 where the air current W will blow lighter pieces back. The small material will pass through the sieves 12 and 14 and collect on the floor 19. Most of the husk pieces never, in fact, even contact at least the upstream or forward portions of the sieve 12, but are thrown completely out of the machine 1 by the stripper 10. Consequently the sieve action will be that much more efficient, as the normally thick bed of husk pieces that forms on such a sieve and that often prevents a substantial percentage of the small particles from passing through is not created.

The kernels will virtually all fall through the second lower sieve 14, and the current W of air will blow even the larger and lighter husk pieces back along the screens 12 and 14 to the overflow plate 15, which itself is formed also as a fine-mesh sieve of construction identical to that of one of the screens 12 or 14 so any remaining kernels will fall through it onto the floor 19. All the kernels on the floor 19 are displaced laterally by the auger 29 and then up via the elevator 30 to the bin 31.

The lighter husk and cob pieces that still remain on the overflow plate 15 will fall off its rear edge as same reciprocates synchronously with the riddle 12, 14, floor 8, and comb 9. They make good mulch that is plowed under before the next planting.

The comb 9 and overflow plate 15 are pivotal about respective shafts 27 and 26 at their upstream ends. Normally they are set at a predetermined angle, determined by operating conditions, and locked in place. Obviously the more upright these two elements are, the slower and finer the separation.

We claim:

1. A corn harvester comprising:
   a chassis adapted to travel along the ground in a normal travel direction;
   means on the front of said chassis relative to said direction for picking ears off cornstalks;
   means on said chassis for reducing said ears to fragments including pieces of cob, corn kernels, and pieces of husk, and for displacing said fragments backward relative to said direction;
   a floor on said chassis positioned to receive said fragments from the reducing means and having a rear edge;
   a comb extending backward from said rear edge and having spaced-apart teeth;
   means for generally horizontally reciprocating said floor and comb to displace said fragements thereon backward;
   a rotary stripper on said chassis having fingers orbitable between said teeth of said comb;
   means for rotating said stripper and thereby lifting most of said husk pieces off said comb by means of said stripper and propelling the lifted-off husk pieces upward and, relative to said direction, backward while separating said kernels and pieces of cob from said husk pieces;
   a riddle behind and below said floor, forming therewith a horizontally open gap, and having relative to said direction an upstream end underneath said comb, whereby kernels and cob pieces fall through said comb across said gap and land on said riddle;
   means for displacing said riddle and for thereby moving said fragments backward with the smaller and denser fragments falling through said riddle;
   blower means for directing a current of air backward through at least said upstream gap and along said riddle and thereby displacing the lighter fragments including mainly said husk pieces backward; and
   means underneath said riddle and said comb for catching the fragments falling through same.

2. The harvester defined in claim 1 wherein said stripper is rotatable about a horizontal axis generally perpendicular to the normal direction of travel of said chassis in a direction to lift said husk pieces from said comb with said fingers.

3. The harvester defined in claim 1, further comprising a curtain suspended from said chassis between said reducing means and said riddle and positioned to intercept the fragments displaced backwardly by said reducing means.

4. The harvester defined in claim 3 wherein said curtain is provided with a forwardly open and backwardly pointed V-shaped stiffening element at its lower edge.

5. The harverster defined in claim 3 wherein said curtain has a lower edge provided with a generally straight stiffening element extending generally perpendicular to the normal direction of travel of said chassis, said chassis carrying a plurality of stops engageable with the ends of said stiffening element when said chassis is tipped, said stops being provided to both lateral sides of said stiffening element and being spaced apart by a transverse distance slightly greater than the transverse length of said stiffening element, whereby when said chassis is level said element can swing forwardly and backwardly between and out of contact with said stops.

6. The harvester defined in claim 1 wherein said fingers of said stripper interdigitate with said teeth of said comb.

7. The harvester defined in claim 1 wherein said fingers of said stripper are angularly offset from one another.

8. The harvester defined in claim 1 wherein said fingers of said stripper have, relative to the normal rotation direction of said stripper, front surfaces inclined backwardly to the axis of rotation of said stripper.

9. The harvester defined in claim 1 wherein said fingers are stiff.

10. The harvester defined in claim 1 wherein said fingers are elastically deformable.

11. The harvester defined in claim 1 wherein said riddle includes a generally horizontal and relatively coarse upper sieve and a generally horizontal and relatively fine lower sieve below said upper sieve.

12. The harvester defined in claim 11 wherein said relatively fine sieve has a mesh size of about 13 mm.

13. The harvester defined in claim 1 wherein said means for reciprocating said floor and for displacing said riddle are connected together for joint and synchronous movement of said riddle and floor.

14. The harvester defined in claim 1, further comprising an overflow plate extending backwardly and upwardly at an incline from the rear edge of said riddle.

15. The harvester defined in claim 14 wherein said overflow plate has transverse sawtooth ridges with steep rear flanks and shallow front flanks.

16. The harvester defined in claim 14 wherein said overflow plate is formed as a sieve like said riddle.

17. The harvester defined in claim 16 wherein said riddle includes an upper coarse-mesh screen and a lower fine-mesh screen, said overflow plate being of the same mesh as said lower screen.

18. The harvester defined in claim 14 wherein said overflow plate is pivotal about a horizontal axis at said downstream edge of said riddle and can be locked in any of a multiplicity of angularly offset positions relative thereto.

19. The harvester defined in claim 18 wherein said overflow plate and said floor are similarly transversely ridged.

* * * * *